March 29, 1966  N. R. RUFFING ETAL  3,243,481
PROCESS FOR MAKING GRAFT COPOLYMERS OF VINYL AROMATIC
COMPOUNDS AND STEREOSPECIFIC RUBBERS
Filed Jan. 8, 1962  2 Sheets-Sheet 1

INVENTORS.
Norman R. Ruffing
Bernie A. Kozakiewicz
Burdette B. Cave
James L. Amos
BY Griswold & Burdick
ATTORNEYS INVENTORS.
Norman R. Ruffing
Bernie A. Kozakiewicz
Burdette B. Cave
James L. Amos BY *Griswold & Burdick*
ATTORNEYS

United States Patent Office 3,243,481
Patented Mar. 29, 1966

3,243,481
PROCESS FOR MAKING GRAFT COPOLYMERS OF VINYL AROMATIC COMPOUNDS AND STEREO-SPECIFIC RUBBERS
Norman R. Ruffing, Midland, Bernie A. Kozakiewicz and Burdette B. Cave, Bay City, and James L. Amos, Midland, Mich., assignors to The Dow Chemical Company, Midland, Mich., a corporation of Delaware
Filed Jan. 8, 1962, Ser. No. 164,728
6 Claims. (Cl. 260—880)

This invention concerns an improved process for polymerizing monovinyl aromatic compounds with rubber. It relates more particularly to improvements in a process for interpolymerizing monovinyl aromatic compounds having the vinyl radical directly attached to a carbon atom of the aromatic nucleus, e.g. styrene, with a minor proportion of natural or a synthetic rubber, to produce thermoplastic polymer compositions possessing good physical and mechanical properties. The invention pertains especially to the preparation of new polymeric compositions comprising interpolymers and/or graft copolymers of monovinyl aromatic compounds and a small proportion of one or more rubbery stereospecific homopolymers or copolymers of butadiene-1,3, and the polymeric products having the rubbery stereospecific butadiene polymer particles uniformly or substantially uniformly dispersed throughout said polymeric composition.

It is known to dissolve an unvulcanized natural rubber in monomeric styrene and to thereafter heat the mixture to a polymerization temperature. For example, Ostromislensky in U.S. Patent No. 1,613,673 dissolves a small amount, e.g. 10 percent or less, of natural rubber in monomeric styrene and polymerizes the mixture to obtain a tough nacreous product having good flexibility and high resistance to impact. However, in preparing such polymeric products the rubber which is dissolved or intimately dispersed in the monomeric styrene, interpolymerizes therewith and tends to form cross-linked or highly branched-chain interpolymers or graft copolymers which are less soluble in the polymerizing mixture than is the rubber. The formation of such cross-linked or highly branched interpolymers in the polymerizing mixture, results in the formation of non-uniform polymeric products, frequently causes separation of the polymerizing mixture into two phases or may result in gelling of the polymerizing mixture, prior to the polymerization being completed. Lang in U.S. Patent No. 2,646,418 discloses the dissolving of various rubbers such as natural rubber, rubbery copolymers of styrene and butadiene, rubbery copolymers of acrylonitrile and butadiene, and rubbery homopolymers of butadiene in monomeric styrene and polymerizing of the mixture in the presence of certain agents, e.g. the unsaturated dimers of alpha-methylstyrene, for inhibiting cross-linking or the formation of insoluble gels in the polymeric product. Amos et al. in U.S. Patent No. 2,694,692 disclose a method of making linear interpolymers of monovinyl aromatic compounds and natural or a synthetic rubber which method involves dissolving the rubber in the monomer and polymerizing the mixture in bulk, i.e. in the substantial absence of an inert diluent, while agitating the mixture, particularly during the early stages of the polymerization, to maintain the rubber in the dispersed phase and to prevent or inhibit the formation of cross-linked or highly branched-chain polymer molecules. McDonald et al. in U.S. Patent No. 2,787,884 describe a method for polymerizing a liquid comprising a polymerizable vinylidene compound in continuous manner wherein a mass of the reacting material which becomes more viscous as the monomer is progressively polymerized is continuously moved through an elongated polymerization zone while at the same time it is subjected to gentle non-turbulent agitation, transversely to the axis of said polymerization zone, sufficient to prevent channeling and to stratify the mass into layers each containing a progressively increasing amount of polymer as portions of the layers move through the polymerization zone. Stein et al. in U.S. Patent No. 2,862,906 disclose a method wherein a solution of a synthetic rubber in monomeric styrene is partially polymerized en masse with stirring, then is mixed with water and the polymerization continued in aqueous dispersion to obtain the polymeric product in the form of small beads.

The various methods heretofore employed for polymerizing solutions or dispersions of rubber in monovinyl aromatic compounds, produce thermoplastic compositions which are generally satisfactory, but are often deficient in one or more properties such as homogeneity or surface texture of molded articles, tensile strength, elongation, resistance to surface craze, or creep rupture, which renders the product less useful for many purposes, e.g. as refrigerator liners, than is desired.

It has now been discovered that thermoplastic polymeric compositions comprising graft copolymers or interpolymers of a major proportion of one or more monovinyl aromatic compounds having the vinyl radical directly attached to a carbon atom of the aromatic nucleus, e.g. styrene, and a minor proportion of natural or a synthetic rubber, which compositions possess good physical and mechanical properties, can readily be obtained by a process which comprises: (a) dissolving or otherwise dispersing, blending or mixing the rubber, preferably a rubbery stereospecific polymer of butadiene such as polybutadiene having a narrow molecular weight distribution and consisting principally of 1,4-addition polymer, with at least one liquid monomeric vinylidene aromatic compound, or a mixture of one or more copolymerizable monoethylenically unsaturated compounds comprising a vinylidene aromatic compound, to form a flowable mixture or liquid wherein the polymerizable portion thereof consists of at least a major proportion by weight of at least one vinylidene aromatic compound; (b) heating a body or mass of the liquid at temperatures that cause polymerization of the monomer while at the same time subjecting the liquid to agitation sufficient to maintain the rubber in the disperse phase, i.e. to maintain the rubber dispersed as fine particles throughout the polymerizing mass, while polymerizing a portion of the monomer; (c) thereafter discontinuing agitation of the mass which results in appreciable shear in the mixture and continuing heating of the mass at polymerization temperatures, preferably at temperatures which maintain the mixture in a flowable condition, until the monomer is substantially polymerized; then (d) finally heating the resulting polymer at elevated temperatures for a time sufficient to produce appreciable cross-linking in the polymer and to convert a substantial portion of the graft copolymer to an insoluble gel having a swelling index value between about 4 and about 20, preferably between about 7 and about 16. The proportion of toluene insoluble gel in the polymeric product is maintained at a value within the range of from about 3.5 to about 6.5 times the amount of rubber initially used, and at a value not exceeding about 70 percent by weight of the polymeric product. The polymeric product is separated from volatile ingredients in any usual way, e.g. by heating the same at elevated temperatures below the decomposition temperature in a vacuum chamber while vaporizing and removing volatile materials.

It has further been found that the properties of the finished product, i.e. the polymeric composition, are dependent upon the manner in which the polymerization is carried out to control the proportion of toluene insoluble gel and its swelling index value in the polymeric product. More particularly, it has been found that the proportion of toluene insoluble gel in the finished product is dependent in part upon the agitation and the viscosity of the solution or dispersion of the rubber in the monomer or polymerizing mass during the early or first stages of the polymerization, e.g. during the period when from about 1 to 35 percent by weight of the monomer is being polymerized. It has also been found that the proportion of the toluene insoluble gel in the finished product and the swelling index of the gel, i.e. the ratio of a given weight of the gel swollen with toluene, to the dry weight of said gel, not only have a material effect upon the physical and mechanical properties of the finished product, but that the proportion of the toluene insoluble gel and its swelling index value can readily be changed by regulating the degree of agitation and the viscosity of the polymerizing mass and controlling the temperature and the degree of polymerization in the first or early stages of the polymerization in mass, and by regulating and controlling the temperature and time for which the polymer is heated to effect cross-linking thereof and to convert the graft copolymer to an insoluble gel, in the final or finishing steps of the process.

More specifically, it has been found that polybutadiene, prepared by polymerization with stereospecific catalysts such as butyl lithium, aluminum alkyls, or combinations of aluminum alkyls and titanium tetrachloride, which polybutadiene preferably has a narrow molecular weight distribution, consists principally of polymer formed by a 1,4-addition reaction with only a small proportion, e.g. 15 percent by weight or less, of the polymer being that formed by a 1,2-addition reaction, and which 1,4-addition polymer consists of a predominant amount of trans-1,4-polymer and a minor proportion of cis-1,4-polymer, can readily be interpolymerized or graft copolymerized with one or more monovinyl aromatic compounds, e.g. styrene, vinyltoluene, or chlorostyrene, by procedures more fully hereinafter described to produce new thermoplastic polymeric products having good homogeneity, together with improved mechanical properties and appearance.

The process as described with reference to stereospecific polybutadiene rubber comprises (a) dissolving the stereospecific polybutadiene rubber in at least one monomeric monovinyl aromatic compound in a concentration between about 0.5 and about 20, preferably between 1 and 15, percent by weight of the solution; and (b) agitating a mass or body of the liquid solution during a first polymerization step when from about 1 to about 35, preferably from about 2 to about 15 percent by weight of the monomer is being polymerized, said agitation being sufficient to maintain the rubber dispersed in the polymerizing mass and to prevent appreciable cross-linking of the polymer, but insufficient to materially inhibit grafting or the formation of high polymer, while controlling the initial vigorous exothermic polymerization reaction; (c) continuing the polymerization, in the absence of agitation which results in appreciable shear in the polymerizing liquid or mixture, by heating the partially polymerized solution prepared in step (b) in an aqueous dispersion, or by heating it in mass at progressively increasing temperatures sufficient to maintain the material in a flowable condition, in a polymerization zone, and preferably at the same time subjecting the material to gentle non-turbulent agitation, in the polymerization zone, such that in forwarding the material through said zone, the monomer is substantially polymerized; then (d) finally subjecting the polymerized material to a heat treatment at elevated temperatures, preferably above the polymerization temperatures, sufficient to cause appreciable cross-linking in the polymeric product and to convert the graft copolymer to an insoluble gel, having a swelling index value of from about 4 to 20, preferably from about 7 to about 16, as determined in toluene.

It may be mentioned that impact strength and percent elongation values for the polymeric product, increase with increase in the swelling index value of the gel up to about 16, whereas creep rupture values for the polymeric product decrease with increase in the swelling index value over this range. Best results for producing a polymeric product having a combination of properties, including good impact strength, elongation and creep rupture values, are usually obtained by controlling the swelling index value of the gel of the polymeric product within the range of from about 7 to about 16, and the percent of toluene insoluble gel in the polymeric product within the range of from about 3.5 to about 6.5 times the amount of rubber initially used, and not exceeding 70 percent by weight of the polymeric product.

The invention is described more particularly with reference to the accompanying drawing wherein.

Figure 1:
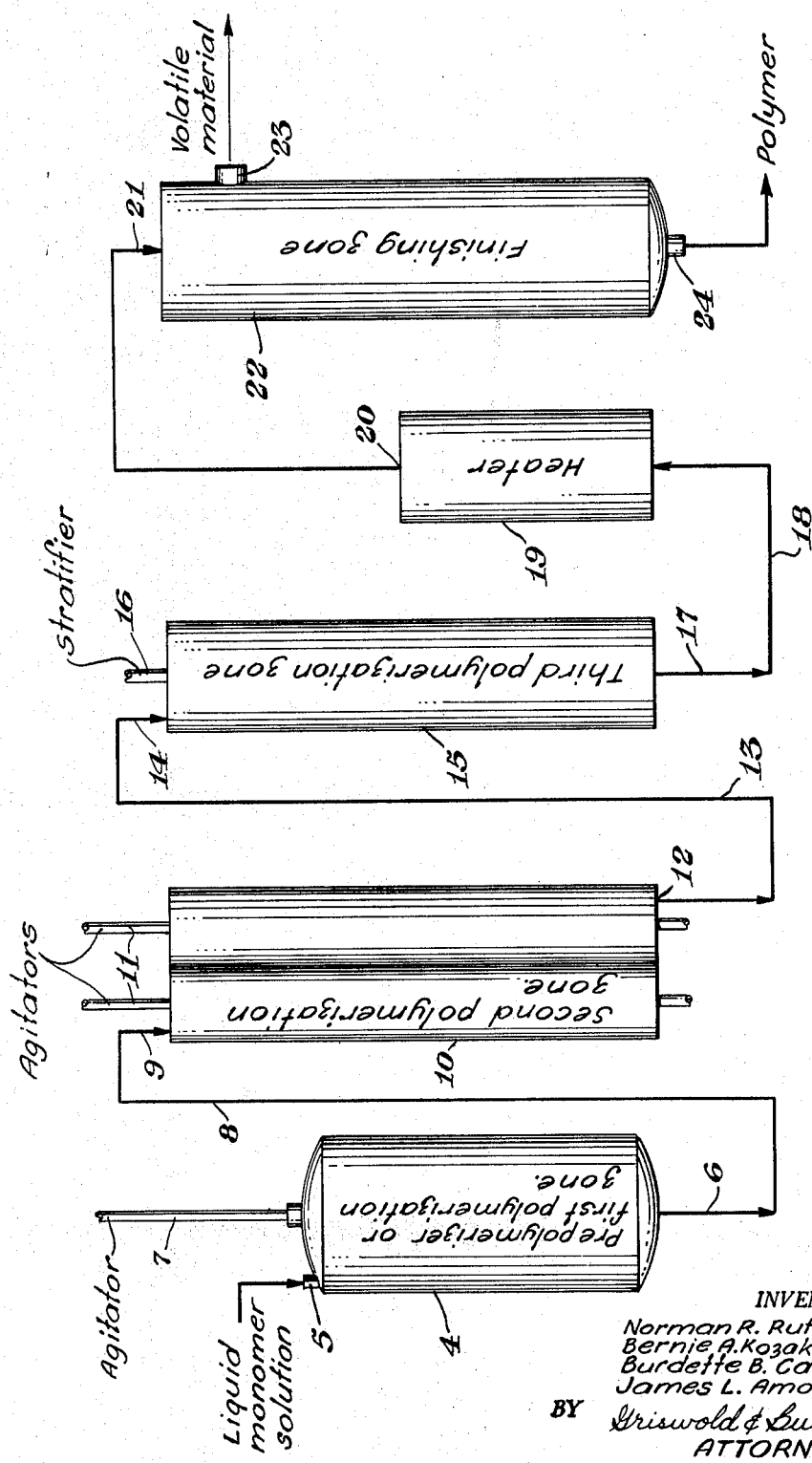
FIG. 1 is a diagrammatic flow sheet illustrating the process as carried out in continuous manner using a plurality of polymerization vessels, a heat exchanger and a finishing vessel.

In FIG. 1 of the drawing, the numeral 4 indicates a polymerization vessel or tower such as a Pfaudler glass lined reaction vessel, a stainless steel vessel, or a vertical tower, equipped with an inlet 5, an outlet 6 and a rotatable stirrer 7 capable of agitating liquid material in said vessel, preferably by a turbulent or rolling action within the body of the liquid. The agitator may be of any desired configuration such as simple blades, propeller, or S-shaped, and is preferably driven through a variable speed mechanism (not shown) so as to permit change in the speed of rotation as desired. A conduit 8 connects to outlet 6 on vessel 4 and leads to an inlet 9 on the top of polymerization vessel 10. Vessel 10 can be a vertical tower as shown and of any desired cross-section, but preferably has a cross-section similar to that of an ellipse, and is equipped with, preferably two or twin agitators 11, adapted to provide agitation of liquid material contained in said vessel, and an outlet 12, and means for heating or cooling the material, such as a jacket or jackets surrounding the vessel 10 and/or hollow agitators 11 through which a heat transfer medium is passed or flowed, e.g. water, oil or steam. A conduit 13 connects outlet 12 on vessel 10 with an inlet 14 on polymerization vessel 15, equipped with a stirrer or stratifier 16 and an outlet 17. A conduit 18 connects outlet 17 on vessel 15 with heater 19, which is suitably a tubular heater having suitable inlets and outlets (not shown) for passage of a heat exchange liquid, e.g. hot oil or steam, therethrough and an outlet 20. The outlet 20 from heater 19 is connected by a conduit to an inlet 21 on the top of finishing vessel 22, which vessel has an outlet 23 for withdrawing vapors of volatilized materials, an outlet 24 on the bottom for withdrawing devolatilized polymer and jacket means for heating or cooling said vessel.

Figure 2:
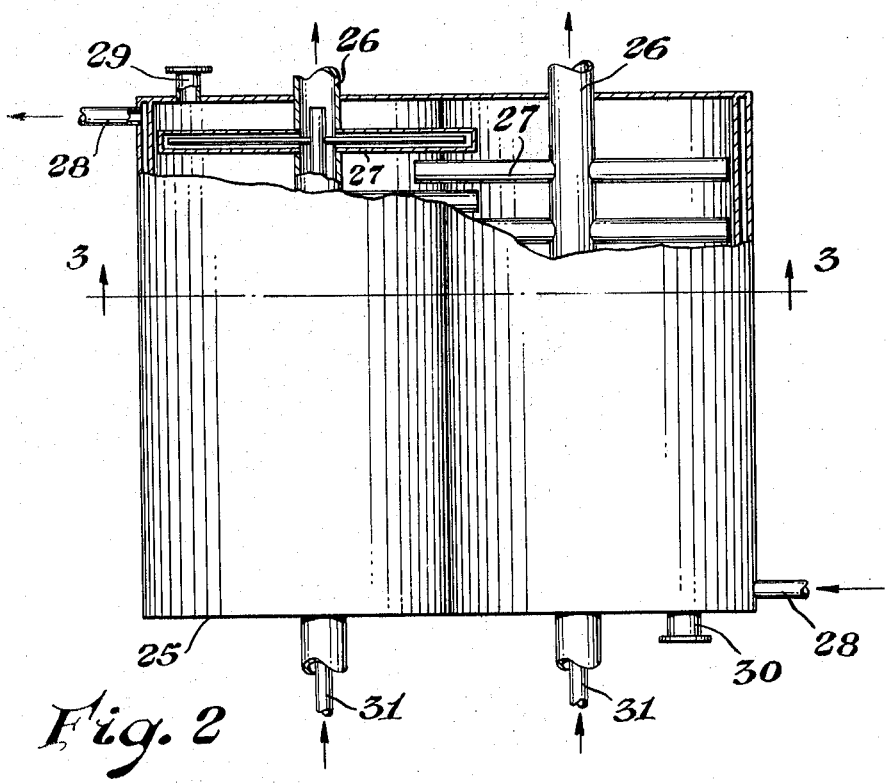
FIG. 2 is a schematic drawing, partly in section of a vertical jacketed polymerization vessel, equipped with rotatable stirrers adapted for agitating liquid material contained in said vessel.

FIGURE 2 of the drawing is a schematic view partly in section of a jacketed elongated polymerization vessel 25, equipped with two hollow agitators 26 having overlapping arms 27 with suitable inlets or outlets 28 to the jacket and an inlet 29 and outlet 30 for the feed of material to, and the withdrawal of material from, said vessel 25. The hollow agitators 26 are equipped with tubes 31 for feed of a heat transfer medium through the shaft and hollow arms of said agitators, thence to waste by discharge from the other end of the hollow shafts of the agitators 26.

Figure 3:
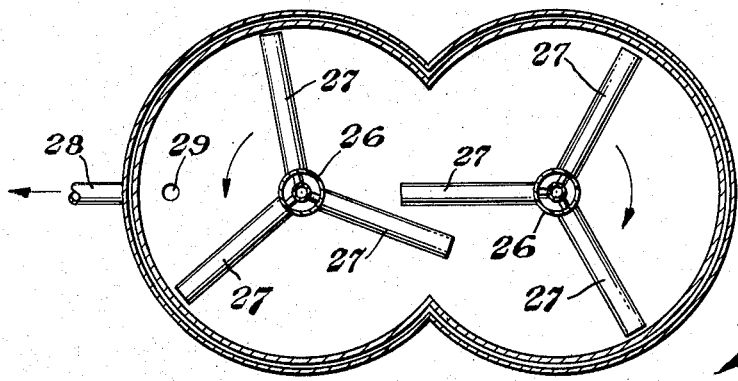
FIG. 3 is a plan view of the vessel taken along the lines 3—3 of FIGURE 2.

FIGURE 3 is a cross-sectional view of the polymerization vessel taken along the line 3—3 of FIGURE 2 and shows the cross-section of a polymerization vessel and an arrangement of agitators with overlapping arms adapted to produce a shearing action on liquid material and suitable for use in practice of the invention.

The method of the invention as illustrated with respect to the polymerization of a solution of a stereo-specific polybutadiene rubber dissolved in monomeric styrene to produce a thermoplastic composition employing an arrangement of apparatus similar to that shown in FIGURE 1 of the drawing, comprises the continuous introduction of a solution of the polybutadiene rubber dissolved in monomeric styrene in a desired concentration, e.g. 5 percent by weight of the solution, through inlet 5 from a storage vessel or dissolving vessel (not shown) into prepolymerizer or the first polymerization vessel 4 and into admixture with a body of the reacting liquid and the polymer being formed at a rate to keep the vessel full of liquid or at a substantially constant operating capacity or level, which reacting liquid is maintained at a polymerization temperature between about 50° and 175° C., preferably between about 85° and 130° C., and is agitated, preferably with a rolling action of the body of the material within the vessel, so as to maintain the polybutadiene rubber in the disperse phase while polymerizing a portion, preferably from about 2 to about 10 percent by weight of the monomeric styrene, i.e. so that the liquid partially polymerized mixture in the vessel contains not more than about 35, preferably from about 7 to about 15 percent by weight of total solids, including the polybutadiene rubber (e.g. 5 percent), in the feed solution. A portion of the reacting and partially polymerized mixture is continuously withdrawn from the prepolymerizer 4 and is forwarded via conduit 8 into the inlet 9 on the top of polymerization vessel 10 and into admixture with a body of reacting liquid substantially filling said vessel, at least to its operating capacity, and comprising monomeric styrene and the polymer being formed in a higher concentration than that of the feed solution, which reacting body of material is maintained at progressively increasing temperatures between about 85° and 250° C., preferably between about 85° and 130° C., and is subjected to agitation by rotating the twin agitators 11 at speeds which may vary from about 50 revolutions per minute or less, preferably from 1 to 20 revolutions per minute, while increasing the degree of polymerization so that the mixture contains from about 20 to 80 perecnt by weight of polymer, or total solids. The partially polymerized mixture is withdrawn from the bottom of the second polymerization vessel 10 through outlet 12 and is fed via conduit 13 into the inlet 14 on the top of polymerization vessel 15 which is substantially filled with a reacting mass of the monomeric styrene and the polymer being formed. The mass is continuously moved forward (downward) through the polymerization vessel 15, suitably under an applied pressure by means of a plastics pump (not shown) interposed in conduit 13 for withdrawing material from vessel 10 and feeding the same into vessel 15, and is subjected to polymerization temperatures within the range of from about 85° to 250° C., preferably from 125° to 175° C., sufficient to maintain the mixture in a flowable condition, while gently stirring the mass transversely to the axis of flow to prevent channeling by rotating the agitator or stratifier 16 at speeds from 2 to 10 or more revolutions per minute, such being constructed of a plurality of bars or cross arms attached to a central shaft and spaced apart from one another at distances along the shaft of from 6 to 12 inches or more. By slowly rotating the agitator in the mass of the material as it is moved through the polymerization zone, the mass is caused to stratify into layers which contain a progressively increasing amount of polymer as they move downward in said vessel until the monomer is polymerized or substantially polymerized. The substantially polymerized material is continuously withdrawn from vessel 15, through outlet 17 and is fed via conduit 18 into heater 19 where it is heated to temperatures between about 200° and 325° C., preferably between about 220° and 285° C., and is fed via a conduit into inlet 21 into the top of finishing kettle 22. Finishing kettle 22 is a vertically mounted cylindrical vessel having in its top an inlet 21 and a polymer receiving cup in direct communication therewith, the bottom of which cup is a multiple orifice plate through which molten polymer may fall in fine streams to the bottom of finishing vessel 22. In the upper third of vessel 22 is an outlet 23 which is connected to a vacuum pump (not shown) for withdrawing volatile material. The molten polymer is withdrawn from vessel 22 via outlet 24. The main body of the finishing vessel 22 is surrounded by a heating jacket to keep molten the polymer devolatilized in said kettle. The molten devolatilized polymer is withdrawn from vessel 22 by means of a plastics extruder wherein it is pressed and extruded as a plurality of fine strands or rods which are cooled and cut to a granular form suitable for molding.

In a preferred embodiment the process is employed for the production of polymeric products or compositions comprising the stereospecific rubbery polymers of butadiene in amounts of from 0.5 to 20, preferably from 1 to about 15, and especially from 2 to 10, percent by weight, interpolymerized or graft copolymerized with an amount within the range of from 99.5 to 80 percent by weight, of one or more monovinyl aromatic compounds of the benzene series having the vinyl radical directly attached to a carbon atom of the aromatic nucleus such as styrene, vinyltoluene, i.e. ortho-, meta- or para- vinyltoluene or mixtures of two or more isomeric vinylxylene, isopropyl styrene, ethylvinylbenzene, chlorostyrene, 2,4-dichlorostyrene, bromostyrene, fluorostyrene, or mixtures of any two or more of such monovinyl aromatic compounds, or mixtures of a predominant amount of any one or more of such monovinyl aromatic compounds and correspondingly not more than 50 percent by weight of one or more vinylidene compounds such as alpha-methylstyrene, para-methyl - alpha - methylstyrene or alpha - ethylstyrene, or acrylonitrile or methyl methacrylate.

The method can advantageously be employed for the production of polymeric products or compositions comprising graft copolymers of monovinyl aromatic compounds and natural and synthetic rubbers such as natural rubber, rubbery copolymers of butadiene and styrene, rubbery copolymers of butadiene and acrylonitrile, and rubbery non-stereospecific homopolymers of butadiene, which compositions possess a plurality of improvements in one or more of the properties, tensile strength, impact strength, elongation, stress cracking, creep rupture, and uniformity of dispersion and in which the polymerized monovinyl aromatic compound is the continuous phase and the rubbery polymer is the disperse phase. The method is more particularly described herein with reference to the stereospecific polybutadiene rubber, but it should be understood that other natural and synthetic rubbers can also be used.

As previously mentioned, it is important that the solution of the rubber, e.g. stereospecific polybutadiene, in the vinylidene aromatic monomer be agitated during the first or early part of the polymerization sufficient to maintain the rubber dispersed throughout the mixture in the form of fine particles not substantially greater than 100 microns in size, preferably of sizes between 2 and 25 microns, until from about 1 to 35, preferably from 2 to 10 percent of the monomer has been polymerized. The degree of agitation can be varied by change in the speed of rotation of the agitator and is dependent upon a number of factors such as the shape or design of the agitator or its blades, the shape and size of the polymerization vessel and the amount of, or level at, which material is maintained therein, as well as the viscosity of the liquid which is in turn dependent upon the temperature of the liquid and the amount of polymer in the partially polymerized liquid. Accordingly, the degree of agitation that is necessary or required in the prepolymerization or first polymerization step for a given vessel equipped with a given design or type of agitator will vary greatly. In general, it may be said that a simple S-shaped impeller blade agitator rotating in a Pfaudler glass lined kettle, filled to its operating capacity with the reacting material at a rate which produces a rolling action on the liquid therein, and the polymerizing of from about 2 to about 10 percent of the monomer in a first or prepolymerization step in the process, will provide agitation satisfactory to obtain the benefits of the invention when used in combination with the agitation employed in the subsequent steps of the polymerization, and the heat treating of the polymer in the latter finishing stages of the process herein described.

When a greater proportion of the monomer, e.g. from 15 to 35 percent, is polymerized in the first step of the process, a lesser degree of agitation is satisfactory.

The agitation that is necessary or required in the successive steps of the process will vary depending in part upon the shape and speed of rotation of the agitators, the design or shape of the vessel and the viscosity of the material, which is in turn dependent upon the temperature and the amount of polymer in the material, being stirred or agitated. Such agitating action, as previously mentioned, is usually or satisfactorily obtained by rotating internally cooled twin agitators having overlapping straight or curved arms in a mass of the material at a rate, or at different rates, which permit ready control of the exothermic polymerization reaction in conjunction with cooling of the reacting material such as by external cooling of the reaction vessel by passing a heat transfer medium through a jacket surrounding the same, and/or by passing a heat transfer medium through the hollow agitator shaft and blades, during the exothermic polymerization reaction. The agitation should not be of such character or degree as to inhibit the formation of grafting or the formation of high polymer molecules or to cause appreciable tearing of the high polymer or graft copolymer molecules into smaller polymer molecules.

The heat treating of the polymer that is necessary or required at elevated temperatures above the polymerization temperatures can be a heat treatment at temperatures between about 200° and 325° C., preferably between about 220° and 285° C., and for a time sufficient to cause appreciable cross-linking in the polymeric product and to convert the graft copolymer to a gel having a swelling index value in toluene of from 4 to 20, preferably from 7 to 16, but insufficient to render it non-thermoplastic or to cause appreciable deterioration of the polymer. The time for which the heat treatment is carried out will vary with the temperature, lower temperatures will require a longer time and conversely higher temperatures will require a shorter heating time. At a temperature of 285° C. a heat-treating time of from 10 to 30 minutes is usually satisfactory, and at higher temperatures a heat-treating time of 1 to 5 minutes is satisfactory. Prolonged heating at the elevated temperatures is to be avoided since it has a deleterious effect on the properties of the polymeric product.

In a continuous process employing an arrangement of apparatus similar to that shown in the drawings, it is a relatively simple matter to regulate and adjust or to control the agitation and degree of polymerization in the several polymerization steps and the heat treating in the heating and finishing steps to obtain a polymeric product comprising an interpolymer or graft copolymer of the rubber, e.g. stereospecific polybutadiene rubber, and one or more monovinyl aromatic compounds or mixtures of at least 50 percent by weight of at least one monovinyl aromatic compound and not more than 50 percent by weight of another monomer such as a vinylidene aromatic compound, e.g. alpha-methylstyrene, para-methyl-alpha-methylstyrene or alpha-ethylstyrene, or acrylonitrile, or methyl methacrylate, which polymeric product has improvement in one or more of the properties, appearance, uniformity, tensile strength, impact strength, elongation, craze resistance, creep rupture, heat distortion temperature and moldability.

In a preferred embodiment the process is employed to produce thermoplastic polymeric products comprising graft copolymers of rubbery stereospecific polymers of butadiene-1,3 such as stereospecific homopolymers of butadiene and rubbery stereospecific copolymers of a major proportion by weight of butadiene and a minor proportion of a monoethylenically unsaturated vinylidene aromatic compound such as styrene, vinyltoluene, vinylxylene, ethylvinylbenzene, isopropylstyrene, chlorostyrene, or dichlorostyrene. The stereospecific butadiene polymers are preferably stereospecific homopolymers of butadiene consisting of a predominant amount of polymer formed by a 1,4-addition reaction and a minor amount of a polymer formed by a 1,2-addition reaction, and for best results the stereospecific homopolymers of butadiene-1,3 consisting principally, e.g. of 85 percent by weight or more, of polymer formed by a 1,4-addition reaction with not more than 15 percent of polymer formed by a 1,2-addition reaction, which stereospecific, principally 1,4-addition homopolymer of butadiene-1,3 has a narrow molecular weight distribution and in which the 1,4-addition polymer consists of a major amount of trans-1,4-polymer and a minor amount of a cis-1,4-polymer, are especially preferred. Such latter stereospecific homopolymers of butadiene-1,3 are employed to produce the new polymeric compositions of the invention having improved physical and mechanical properties.

In practice, employing a stereospecific homopolymer of butadiene consisting principally of polymer formed by a 1,4-addition reaction and not more than 15 percent of polymer formed by a 1,2-addition reaction, which stereospecific polybutadiene is of narrow molecular weight distribution, the proportion of graft copolymer in the final product is maintained at a value between about 3.5 and 6.5 times as great as the amount of polybutadiene rubber initially used, but not exceeding about 70 percent by weight of the polymeric product. For example, when employing a feed solution consisting of 5 percent by weight of the stereospecific polybutadiene rubber and 95 percent of monomeric styrene, the final product should contain from 17.5 to 32.5 percent of graft copolymer or gel. When employing a feed solution consisting of 15 percent by weight of the stereospecific polybutadiene dissolved in monomeric styrene, the percent of gel or graft copolymer in the product will be within the range of from 52.5 to 70 percent. The percent of gel or graft copolymer and the swelling index value of the gel are readily determined by a simple test. The method of determining the percent of gel or graft copolymer is to place 5 parts by weight of the polymeric product in 100 parts by weight of toluene and stir the mixture for a period of 2 hours at a temperature of 60° C. A weighed portion of the liquid is centrifuged for one hour at 60° C. and 25,000 gravities, then is removed from the centrifuge. The supernatent liquid is decanted and the precipitate is weighed. The precipitate is dried by heating for a period of 30 minutes at a temperature of 215° C. and under 1–3 millimeters of mercury absolute pressure, then is cooled and reweighed. The weight of the dry material represents the proportion of the graft copolymer in the polymeric product. The swelling index of the gel is determined by dividing the weight of the wet precipitate by the weight of the dry precipitate. The swelling index of the gel or graft copolymer is maintained at a value between about 4 and 20, preferably between about 7 and 16, and is controlled by the time and temperature conditions employed in the heat-treating and finishing steps of the process, which are readily controlled by regulating the temperature of, the rate of flow and the residence time, of material through and in said heat-treating and finishing zones.

The following examples illustrate ways in which the principle of the invention has been applied but are not to be construed as limiting its scope.

Example 1

A solution consisting of 5.8 percent by weight of stereospecific polybutadiene rubber having a Mooney number of 35 ML1+4(212° F.) which rubber was free of gels, i.e. it was an amorphous polymer, consisting of over 90 percent 1,4-addition product and about 7.5 percent 1,2-addition product or vinyl structure, with the 1,4-addition product consisting of about 35 percent cis-1,4-configuration and correspondingly about 65 percent trans-1,4-configuration, and 94.2 percent by weight of styrene, was prepared by dissolving the polybutadiene in monomeric styrene at room temperature by agitating the mixture for a period of about 16 hours.

(A) A charge of 700 grams of the solution together with 0.2 percent by weight of unsaturated dimer of alpha-methyl styrene and 0.5 percent by weight of 2,6-di-tert-butyl-4-methyl phenol was placed in a 1.5 liter round bottom glass-reaction vessel having a diameter of 6 inches and equipped with a stirrer and reflux condenser. The stirrer consisted of a 5/16-inch diameter stainless steel shaft having two 5/16-inch diameter cross-arms 3-inches long spaced 1½ inches apart along the shaft, the lowermost cross-arm being at the bottom end of the shaft. The stirrer was driven by an electric motor with a variable speed control so that the agitation could be controlled by regulating the rate or speed of rotation of the agitator. The reaction vessel was heated by immersing the lower two-thirds of the vessel in a body of a liquid heat-transfer medium, e.g. triethylene glycol, maintained at a desired polymerization temperature.

After placing the 700 grams of the solution of the polybutadiene rubber and monomeric styrene in the glass reaction vessel heated by means of the liquid heat-transfer bath, the mixture was agitated by rotating the stirrer at a rate of 100 revolutions per minute while heating the mixture at temperatures of 114–116° C. for a period of 5.5 hours. The conversion was 31.6 percent. The partially polymerized mixture was removed from the polymerization vessel and portions of the mixture were then placed in 1¼ inch internal diameter by 6 inches long screw cap glass bottles. Polymerization of the mixture was continued without agitation by heating the mixture in the sealed glass bottles under time and temperature conditions as follows: 2½ hours at 125° C.; 1½ hours at 135° C.; 1½ hours at 145° C.; and 1½ hours at 165° C. Thereafter, the polymeric product was subjected to a heat treatment at a temperature of 285° C. for a period of 20 minutes, then was allowed to cool to room temperature. The product was crushed or cut to a granular form and was devolatilized by heating the same in a vacuum oven at a temperature of 150° C. for a period of 2 hours under an absolute pressure of from 1 to 3 millimeters of mercury. The devolatilized product was cooled and ground to a granular form. The yield was 95.7 percent. Portions of the devolatilized product were compression molded at temperatures between 150° and 160° C. under about 10,000 pounds per square inch gauge pressure to form test bars of ⅛ x ½ inch cross section. These test bars were used to determine the tensile strength, yield point and percent elongation values for the polymer employing procedures similar to those described in ASTM, D638–49T. Impact strength was determined by procedure similar to that described in ASTM D256–47T. Other molded test bars were used to determine the Vicat softening temperature. Other portions of the devolatilized product were used to determine the percent of gel in the polymer and the swelling index. The procedure employed to determine the percent of gel was to place one gram of the polymer in 20 ml. of toluene, agitate the mixture for 2 hours at 60° C., then centrifuge the mixture for 1 hours at 60° C., decant the supernatent liquid and weight the wet precipitate. The wet precipitate was dried by heating the same in a vacuum oven at a temperature of 215° C. for a period of 30 minutes under 1–3 millimeters of mercury absolute pressure. The percent gel was calculated as the weight of the dry precipitate divided by the weight of the polymeric product initially used. The swelling index was calculated as the ratio of the weight of the wet precipitate divided by the weight of the dry precipitate. The polymeric product had the properties listed under A below.

(B) For purpose of showing the effect of a longer time of heat treatment of the polymeric product at a temperature of 285° C., an experiment was carried out in the same glass reaction vessel and under similar polymerization conditions except that the polymer was subjected to a heat treatment at a temperature of 285° C. for a period of 40 minutes. The product had the properties listed under B below.

(C) For purpose of showing the effect of agitation in the first stages of the polymerization on the properties of the final product, an experiment was carried out in the same glass reaction vessel and under similar polymerization conditions, except that the mixture was stirred by rotating the agitator at a speed of 30 revolutions per minute while heating the mixture at polymerization temperatures of 114–116° C. for a period of 5.5 hours. Thereafter the polymerization was completed and the heat treatment of the polymer was carried out as described in part A above. The polymeric product had the properties listed under C below.

|  | A | B | C |
|---|---|---|---|
| Conversion after agitating for 5.5 hrs. at 114–116° C., percent | 31.6 | 33.5 | 30.7 |
| Speed of Agitator, r.p.m. | 100 | 100 | 30 |
| Time of heat treatment at 285° C., minutes | 20 | 40 | 20 |
| Yield of Polymer, percent | 95.7 | 97 | 94 |
| Tensile Strength, lbs./sq. in. | 4,390 | 4,870 | 3,660 |
| Yield Point, lbs./sq. in. | 4,420 |  | 3,010 |
| Elongation, percent | 24.8 | 7 | 32.2 |
| Impact Strength, ft.-lbs. | 1.09 | 0.74 | 1.01 |
| Vicat Softening Point, ° F. | 206 | 206 | 211 |
| Melt Viscosity, cps. | 3,700 | 3,900 | 6,000 |
| Gel, percent | 22.9 | 21.6 | 35.6 |
| Swelling Index | 9.9 | 7.8 | 11 |
| Solution Viscosity (10%), cps. | 22.1 | 19 | 35.3 |

Example 2

A polymeric product was prepared by polymerizing a solution of 5.8 percent by weight of stereospecific polybutadiene rubber similar to that employed in Example 1, and 94.2 percent by weight of monomeric styrene, containing 0.2 percent by weight of unsaturated dimer of alpha-methyl styrene and 0.5 percent of 2,6-tert. butyl-4-methyl phenol, by procedure similar to that employed in Example 1, except that the mixture was agitated by rotating the agitator at a rate of only 30 revolutions per minute. The polymerization conditions, heat treatment and testing procedures were otherwise the same as employed in said example. The polymeric product had the properties:

Conversion after agitating for 5.5 hrs. at 114–116° C., percent _____ 30.7
Time of heat treatment at 285° C., minutes _____ 20
Yield of polymer, percent _____ 94
Tensile strength, lbs./sq. in. _____ 3660
Yield point, lbs./sq. in. _____ 3010
Elongation, percent _____ 32.2
Impact strength, ft.-lbs. _____ 1.01
Vicat Softening Point, ° F. _____ 211
Melt Viscosity _____ 6000
Gel, percent _____ 35.6
Swelling Index _____ 11.0
Solution Viscosity (10%), cps. _____ 35.3

Example 3

A polymeric product was prepared by polymerizing a solution of 5.8 percent by weight of the stereospecific polybutadiene rubber similar to that employed in Example 1, and 94.2 percent of monomeric styrene containing 0.15 percent by weight of unsaturated dimer of alpha-methylstyrene, 0.5 percent of 2,6-di-tert.-butyl-4-methylphenol and 2 percent of white mineral oil, by procedure similar to that employed in Example 1. The results obtained and the properties of the product were as follows:

| | |
|---|---|
| Conversion at end of agitation, percent | 35.0 |
| Time of heat treatment at 285° C., minutes | 30 |
| Yield of Polymer, percent | 94.3 |
| Tensile Strength, lbs./sq. in. | 2930 |
| Yield Point, lbs./sq. in. | 3180 |
| Elongation, percent | 27 |
| Impact Strength, ft.-lbs. | 1.45 |
| Vicat Softening Point, ° F. | 197 |
| Melt Viscosity | 4000 |
| Gel, percent | 25.3 |
| Swelling Index | 9.9 |
| Solution Viscosity (10%), cps. | 24.5 |

*Example 4*

A polymeric product was prepared by polymerizing a solution of 10 percent by weight of stereospecific polybutadiene rubber similar to that employed in Example 1, and 90 percent by weight of a mixture of equal parts by weight of monomeric styrene and ortho-vinyltoluene, in admixture with 0.5 percent by weight of unsaturated dimer of alpha-methylstyrene and 0.5 percent of 2,6-di-tert.-butyl-4-methylphenol, by procedure similar to that employed in Example 1, except that the mixture was agitated by rotating the stirrer at a rate of 30 revolutions per minute, and the polymeric product was subjected to a heat treatment at 285° C. for a period of 30 minutes. The results obtained and the properties of the product were as follows:

| | |
|---|---|
| Conversion at end of agitation, percent | 31.2 |
| Time of heat treatment at 285° C., minutes | 30 |
| Yield of Polymer, percent | 95 |
| Tensile Strength, lbs./sq. in. | 2520 |
| Yield Point, lbs./sq. in. | 2080 |
| Elongation, percent | 23 |
| Impact Strength, ft.-lbs. | 1.08 |
| Vicat Softening Point, ° F. | 219.5 |
| Melt viscosity | 7600 |
| Gel, percent | 52.8 |
| Swelling Index | 8.5 |

*Example 5*

A charge of 700 grams of a solution of 94.2 percent by weight of monomeric styrene and 5.8 percent by weight stereospecific polybutadiene consisting of more than 90 percent by weight of polymer formed by a cis-1,4 addition reaction, which solution contained 0.2 percent by weight of unsaturated dimer of alpha-methyl styrene, 0.5 percent of white mineral oil and 0.5 percent of 2,6-di-tert.-butyl-4-methyl phenol was placed in a polymerization vessel equipped with a stirrer and reflux condenser, similar to that employed in Example 1. The mixture was agitated by rotating the stirrer at a rate of 60 revolutions per minute while heating the solution at a temperature of 115° C. for a period of 6.5 hours. The partially polymerized solution contained 24.6 percent by weight of polymer. Thereafter, the partially polymerized solution was placed in sealed glass bottles and the polymerization continued by heating the solution without agitation under time and temperature conditions as follows: 2½ hours at 125° C.; 1½ hours at 135° C.; 1½ hours at 145° C.; and 1½ hours at 165° C. The polymeric product was heated for 20 minutes at a temperature of 285° C., then was cooled, was removed from the glass container and was ground to a granular form, then was devolatilized by heating in a vacuum oven at a temperature of 150° C. for a period of 2 hours under an absolute pressure of from 1 to 3 millimeters of mercury. The devolatilized material was cooled and ground to a granular form. The yield of polymer was 93.5 percent. The polymeric product had the properties:

| | |
|---|---|
| Tensile Strength, lbs./sq. in. | 2030 |
| Yield Point, lbs./sq. in. | 2198 |
| Elongation, percent | 31 |
| Impact Strength, ft.-lbs. | 1.06 |
| Vicat Softening Point, ° F. | 204 |
| Melt Viscosity | 1940 |
| Gel, percent | 29.6 |
| Swelling Index | 11.7 |

*Example 6*

A composition was prepared by polymerizing 700 grams of a solution of 94.2 percent by weight of styrene and 5.8 percent of stereospecific polybutadiene consisting of 97 percent by weight of polymer formed by a cis-1,4 addition reaction, employing apparatus and procedure similar to those employed in Example 5. The polymeric product had the properties:

| | |
|---|---|
| Tensile Strength, lbs./sq. ft. | 2686 |
| Yield Point, lbs./sq. ft. | 2567 |
| Elongation, percent | 34.5 |
| Impact Strength, ft.-lbs. | 1.28 |
| Vicat Softening Point, ° F. | 310 |
| Melt Viscosity | 6000 |
| Gel, percent | 24.1 |
| Swelling Index | 15.2 |
| Solution Viscosity (10%), cps. | 39.8 |

*Example 7*

A composition was prepared by polymerizing a solution of 94.2 percent by weight of styrene and 5.8 percent of stereospecific polybutadiene rubber consisting of 47 percent by weight of polymer formed by a 1,2-addition reaction and a predominant amount of the polybutadiene being formed by a 1,4-addition reaction, together with 0.2 percent of unsaturated dimer of alpha-methylstyrene and 0.5 percent of 2,6-di-tert.-butyl phenol, employing an apparatus and procedure simliar to that employed in Example 5, except that the polymeric product was subjected to a heat treatment at a temperature of 285° C. for only 10 minutes. The polymeric product had the properties:

| | |
|---|---|
| Tensile Strength, lbs./sq. in. | 3010 |
| Yield Point, lbs./sq. in. | 3060 |
| Elongation, percent | 12 |
| Impact Strength, ft.-lbs. | 1.31 |
| Vicat Softening Point, ° F. | 210 |
| Melt Viscosity | 6400 |
| Gel, percent | 34.6 |
| Swelling Index | 11.8 |

*Example 8*

A polymerization train comprising an arrangement of apparatus, similar to that shown in the drawing, interconnected with suitable conduits and plastics pumps so that a liquid comprising a polymerizable monomer could be fed to and forwarded through the train in continuous manner, and equipped with suitable heat exchange means and agitating means so that heating or cooling and stirring or agitating of the material could readily be controlled as the monomer was progressively polymerized, which polymerization train consisted essentially of: (1) a prepolymerizer or first polymerization zone comprising a jacketed 10,000 gallon capacity Pfaudler glass lined reaction vessel equipped with an S-shaped blade stirrer; (2) a second polymerization zone comprising a jacketed vertical elongated tower 16 feet high having a cross-section of approximately 20 square feet and a cross-sectional shape similar to that formed by two intersecting 48-inch diameter circles drawn on centers spaced 32 inches apart, and which tower was formed by joining together two three-quarter cross-sectional pieces of two 48-inch diameter cylinders, fitting each ¾-cylindrical section with an internally cooled stirrer consisting of a plurality of banks of 3-inch diameter hollow cross-arms about 20 inches long spaced 120° apart in a horizontal plane and attached to a hollow 6-inch diameter vertical shaft on 4-inch centers between banks of the cross-arms, which polymerization zone had a capacity for about 16,000 pounds of material; (3) a third polymerization zone comprising a jacketed vertical tower 48-inches in diameter by 16 feet high equipped with a single stirrer comprising a plurality of banks of straight bars about 2-inches in diameter and 20 inches long attached to a central 4-inch diameter shaft on centers spaced 12-inches apart on the vertical axis and which vessel or tower had a capacity for 10,000 pounds of material; (4) a tubular heat exchanger; and (5) a finishing zone comprising a vertical tower of about 60 inches diameter by 10 feet high equipped with a suitable inlet at the top for feed of material thereinto a plurality of fine streams, which are allowed to fall freely through space within the vessel while vaporizing volatile ingredients therefrom, while the strands of devolatilized material coalesce or collect as a body of devolatilized polymer in the bottom or lower portion of the tower, an outlet for withdrawing vapors of the volatile ingredients and an outlet for withdrawing the hot devolatilized or finished polymer or product.

In making the polymeric product of the invention employing an arrangement of apparatus similar to that just described, a liquid solution comprising monomeric styrene containing about 5.5 percent by weight of stereospecific polybutadiene of narrow molecular weight distribution, having a Mooney number ML 1+4 (212° F.) of about 10 to 50 or higher and consisting principally of polymer formed by a 1,4 addition reaction with a predominant amount of the polymer being trans 1,4 addition, and containing less than 15 percent vinyl unsaturation, together with from 3 to 20 percent of an inert diluent such as ethylbenzene, ethyltoluene, ethylxylene, diethylbenzene, or isopropylbenzene, boiling at temperatures between 130° and 200° C., and/or small amounts e.g. from 0 to 5 percent, of additives such as white mineral oil, stabilizers, antioxidants, dyes, pigments, polymerization regulators or initiators and the like, if desired, is continuously fed at a rate of from about 1500 to 3000 pounds per hour to the first polymerization zone and into admixture with a reacting mass or solution of the styrene and the stereospecific polybutadiene and the polymer being formed, which mass is maintained at a level comparable to the operating capacity of the reaction vessel and is heated at temperatures between 85° and 130° C. and is agitated with a rolling action of the material in said vessel to maintain the stereospecific polybutadiene uniformly dispersed in the liquid while polymerizing from 2 to 10 percent of the monomer. A portion of the reacting mass containing between about 7 and 15 percent by weight of polymer or total solids is continuously withdrawn from the first polymerization vessel, and at a rate substantially the same as the rate of feed to said vessel, and is fed to the second polymerization zone wherein it is heated at temperatures progressively increasing from about 85° to 135° C. as the material flows downward through said zone and is agitated by action of the twin mixing stirrers rotating at a speed which permits ready control of the vigorous exothermic polymerization reaction and which inhibits appreciable cross-linking of the polymer, but does not materially inhibit grafting or the formation of high polymer, while increasing the degree of polymerization of the monomer to from about 30 to 50 percent of that which is theoretically possible. The partially polymerized solution is continuously withdrawn from the second polymerization zone and is fed to the third polymerization zone wherein it is heated at progressively increasing temperatures between about 120° C. and 175° C. or higher, as the material flows through the elongated zone and is agitated by gentle non-turbulent stirring sufficient to prevent channelling and to cause stratifying or layering of the mass such that the mass contains a progressively increasing proportion of polymer as it moves through said polymerization zone and the monomer is polymerized or substantially polymerized. The material containing from about 75 to 85 or more, percent by weight of polymer is continuously withdrawn from the third polymerization zone and is fed through a heat exchanger wherein it is heated at temperatures between about 220° and 265° C. or higher and is forwarded to the finishing zone. The hot material is introduced into the finishing zone as a plurality of fine strands which are allowed to fall freely in space under reduced pressure, e.g. at from 10 to 75 millimeters of mercury, absolute pressure, to vaporize volatile ingredients and separate them from the polymer. The vapors of the volatile ingredients are separately withdrawn from the finishing zone, while the devolatilized polymer collects as a body in the lower portion of the finishing zone and is withdrawn by means of a plastics pump. The polymer is withdrawn and fed to a plastics extruder wherein it is pressed and extruded as a sheet, or preferably, as a plurality of strands or rods which are cooled and cut to granular form suitable for molding.

In a specific embodiment, a solution of 5.5 percent by weight of polybutadiene consisting principally of 1,4-addition polymer containing less than 10 percent vinyl unsaturation, having a narrow molecular weight distribution and a Mooney number of 35, dissolved in monomeric styrene, together with 10 parts of ethylbenzene, 1 part of white mineral oil, 0.4 part of 2,6-di-tert.-butyl-4-methylphenol, as antioxidant, and 0.05 part of unsaturated dimer of alpha-methyl styrene, as polymerization regulator, per 100 parts by weight of the solution of polybutadiene and monomeric styrene, is fed from storage or a dissolving vessel at a rate of about 2200 pounds per hour to the prepolymerizer or first polymerization zone which is filled to its operating capacity with 7500 pounds of a reacting mass of the polymerizable liquid and the polymer being formed and is maintained at a temperature of 112° C. while being agitated by rotating the stirrer at a rate of 67 revolutions per minute. Partially polymerized liquid is continuously withdrawn from the first polymerization zone at a rate smaller to the rate of feed of liquid material thereto and as a liquid containing about 11 percent by weight of polymeric material. The liquid withdrawn from the prepolymerizer or first polymerization zone is fed at a temperature of 88° C. into the top of the second polymerization zone substantially filled with a reacting mass of the liquid and the polymer being formed, and passes downward therein through progressively increasing temperatures which range from 112° C. in the mid-section of said zone to 133° C. at the lower section of said zone, while the material is continuously agitated by rotating the twin stirrers with overlapping arms in opposite directions, each at a rate of about 10 revolutions per minute. Partially polymerized liquid containing about 37 percent by weight of polymer is withdrawn from the bottom of the second polymerization zone at a rate corresponding to the rate of feed to said zone and is fed to the top of the third polymerization tower. The material fed to the top of the third polymerization zone, substantially filled with a reacting mass of the liquid and polymer being formed, is passed downward through said zone and subjected to progressively increasing temperatures which range from about 140° C. at the top of said zone to 155° C. in the midsection of said zone to 165° C. or higher, at the lower section of said polymerization zone, while at the same time the material in said zone is subjected to gentle non-turbulent agitation sufficient to prevent channelling and to stratify the material into layers by rotating the agitator or stirrer at a rate of from 2 to 3 or more revolutions per minute. The substantially polymerized semi-liquified or flowable material containing about 85 percent by weight or more of polymer is withdrawn from the third polymerization zone and is passed through a tubular heat exchanger wherein it is heated to a temperature of about 235° C. and is forwarded to the finishing zone wherein it is fed through a die having a plurality of ¼-inch drill holes therein as a plurality of strands which are allowed to fall freely through space in the finishing zone for a distance of about 3 feet, in an atmosphere of about 10 millimeters absolute pressure while withdrawing vapors of volatilized ingredients from said zone.

The devolatilized polymer coalesces or collects as a body of the molten polymer at temperatures between about 220° and 235° C. in the bottom of the finishing vessel or zone, from which it is withdrawn and is extruded into strands which are cooled and cut to a granular form suitable for molding.

The total time of heating an infinitesimal proportion of the substantially polymerized material in the heating and finishing zones is from about 1 to 1.5 hours at temperatures between about 2200 and 235° C. The product is obtained at a rate of about 1900 pounds per hour and has the properties:

| | |
|---|---|
| Tensile Strength, lbs./sq. in. | 3530 |
| Yield Point, lbs./sq. in. | 3520 |
| Elongation, percent | 32.4 |
| Impact Strength, ft.-lbs. | 1.01 |
| Vicat Softening Point, ° F. | 206 |
| Melt Viscosity | 4,500 |
| Gel, percent | 23 |
| Swelling Index | 8.6 |
| Solution Viscosity (10%), cps. | 23 |
| Texture[a] | 30 |
| Creep Rupture, minutes | >10,000 |

[a] A measure of the smoothness of the surface of a molded test piece of the polymeric product as determined by a Surf Tester, i.e., the depth of indentations in micro-inches in the surface of the molding.

When the liquid is maintained in the first polymerization zone or prepolymerizer under similar conditions of temperature and agitation until the degree of polymerization is about 20–25 percent, and the remaining polymerization and finishing steps are carried out in a manner similar to that described above, the product is found to contain 16.1 percent of a gel, a swelling index of 8.3 and an elongation of 10.4 percent.

Repeated tests of the polymerization process have shown that by maintaining the percent by weight of polymer in the partially polymerized liquid in the prepolymerizer or first polymerization zone at from 7 to 15 percent by weight, employing the apparatus described and rotating the agitator in the prepolymerizer at a fixed rate of 67 revolutions per minute, and rotating the agitators in the second polymerization zone at from 8 to 10 revolutions per minute, results in a product having a gel content between 20 and 25 percent, a swelling index between 8 and 9.5, tensile strength between 2900 and 3400 pounds per square inch, elongation between 28 and 40 percent, notched impact strength from 0.97 to 1.3 foot pounds per inch of notch, Vicat Softening points of from 200–206° F., melt index values between 40 and 50, and a product that can readily be molded in usual ways to form articles having a smooth surface and uniform texture free from "fish eyes" or roughness, and which product has a creep rupture value greater than 10,000 minutes.

Creep rupture of the polymeric product was determined by compression molding portions of the product at temperatures between 150° and 160° C. under 10,000 pounds per square inch gauge pressure to form test pieces of 0.075 x 0.250 inch cross section. These test pieces were used to determine a creep rupture value for the polymer product. The procedure for determining creep rupture was to clamp one end of a test piece between jaws of a fixed clamp in a horizontal plane, then attach a movable clamp to the other end of a test piece 1¼ inches long and apply a load to the test piece corresponding to 2000 pounds per square inch of cross section, and observe the time in minutes until rupture of the test piece occurred, or until a period of 7 days, i.e. a period of greater than 10,000 minutes, had elapsed without rupture of the test piece.

The new thermoplastic polymer compositions comprising the graft copolymers of monovinyl aromatic compounds and from 1 to 15 percent by weight of a stereospecific homopolymer of butadiene-1,3, consisting principally of polymer formed by a 1,4-addition reaction with not more than 15 percent of the polybutadiene being formed by a 1,2-addition reaction are useful for making molded articles such as sheet, film, boxes, containers, trays, refrigerator liners and the like. In repeated tests of refrigerator door liners molded from the thermoplastic polymer compositions it has been found that the molded articles have excellent resistance to impact, warping, creep rupture, cracking or breaking when subjected to severe racking or slamming of refrigerator doors fitted with such molded pieces or articles.

For purpose of showing the effect of the heat treatment in the finishing zone in the above process in combination with the agitation and degree of polymerization in the first polymerization zone in the process carried out as described above and maintaining the concentration of polymer in the first polymerizer or prepolymerizer at from 10–12 percent by weight, a portion of the substantially polymerized mixture was withdrawn from the third polymerization zone just prior to feed of the stream of the material into the heating zone. The polymeric product was recovered by vaporizing and removing the volatile ingredients under vacuum, then cooling and crushing the product to a granular form. A portion of the product was molded into test pieces and the properties determined by procedure previously described. The properties of the product not subjected to the heat treatment are reported in the following table under A below. The properties of the polymeric product which was subjected to a heat treatment in the heating and finishing steps as described above are reported under B. The products had the properties:

| | A | B |
|---|---|---|
| Tensile Strength, lbs./sq. in. | 1,940 | 3,200 |
| Yield Point, lbs./sq. in. | 2,640 | 3,400 |
| Elongation, percent | 12 | .33 |
| Impact Strength, ft.-lbs. | 1.42 | 1.1 |
| Vicat Softening Point, ° F. | 208 | 208 |
| Melt Viscosity | | 4,000 |
| Gel, percent | (¹) | 19.0 |
| Swelling Index | (¹) | 8.5 |
| Solution Viscosity (10%) | .26 | 21 |
| Texture | 78 | 35 |

¹ Gel was too soluble to determine by test.

In a manner similar to that described in the foregoing examples, thermoplastic polymer compositions comprising graft copolymers of one or more vinylidene compounds such as monovinyl aromatic hydrocarbons or nuclear halogenated monovinyl aromatic hydrocarbons, or mixtures of at least 70 percent by weight of at least one such monovinyl aromatic compound and not more than 30 percent by weight of another monoethylenically unsaturated vinylidene compound copolymerizable therewith such as alpha-methylstyrene, acrylonitrile or methyl methacrylate and a rubbery stereospecific polymer of butadiene-1,3 such as rubbery stereospecific copolymers of a predominant amount of butadiene-1,3 and a minor proportion of a vinylidene aromatic compound such as styrene, vinyltoluene, vinylxylene, ethylvinylbenzene, isopropylstyrene, tert.-butylstyrene, chlorostyrene, or 2,4-dichlorostyrene, can readily be prepared by polymerizing a solution or uniform dispersion of the rubbery stereospecific butadiene polymer and the monomers, by the method therein described and regulating the degree of agitation and polymerization in the various steps and the heat treatment of the polymeric product in a manner similar to that set forth in the examples.

Example 9

By procedure similar to that described in Example 8 and employing the same polymerization apparatus, a solution of 7.5 percent by weight of GR–S 1006 rubber, a copolymer of approximately 76.5 percent by weight of butadiene and 23.5 percent of styrene having a Mooney Number of 50, dissolved in monomeric styrene, together with 10 parts of ethylbenzene, 0.25 part of white mineral oil, 0.4 part of 2,6-di-tert.-butyl-4-methylphenol, as antioxidant, and 0.05 part of unsaturated dimer of alpha-methyl styrene, as polymerization regulator, per 100 parts by weight of the solution of the rubber and monomeric styrene, was fed at a continuous rate of about 2200 pounds per hour to the prepolymerizer and was polymerized in continuous manner under conditions as described in said example. The polymeric product had the properties:

| | |
|---|---|
| Tensile strength, lbs./sq. in. | 3170 |
| Yield point, lbs./sq. in. | 3320 |
| Elongation, percent | 34.6 |
| Impact strength, ft.-lbs. | 0.95 |
| Vicat softening point, ° F. | 206 |
| Melt viscosity, cps | 5500 |
| Gel, percent | 20.4 |
| Swelling index | 11.5 |
| Texture | 60 |
| Creep rupture, minutes | 10000 |

We claim:

1. In a method for making a thermoplastic polymer composition comprising a graft copolymer wherein a liquid comprising at least one polymerizable monomeric vinylidene aromatic compound having a minor proportion of a rubbery synthetic butadiene polymer contained therein, is heated at elevated temperatures to polymerize the monomer, the steps of:

(a) heating a mixture of said rubber and vinylidene aromatic compound containing (1) about 80 to about 99.5 weight percent of a monoethylenically unsaturated vinylidene monomer selected from the class consisting of aromatic vinylidene monomers and acrylonitrile, said monoethylenically unsaturated vinylidene monomer containing at least 50 weight percent of at least one monovinyl aromatic monomer having the vinyl radical directly attached to the aromatic nucleus, said monoethylenically unsaturated vinylidene monomer being the sole polymerizable monomer in said mixture and (2) about 0.5 to about 20 weight percent of a rubbery stereospecific butadiene polymer comprising at least a major proportion by weight of butadiene-1,3 chemically combined with not more than a minor proportion of a monoethylenically unsaturated vinylidene aromatic compound copolymerizable therewith, at polymerization temperatures between about 50–175° C., while subjecting the liquid to sufficient agitation to maintain the butadiene polymer dispersed throughout the polymerizing mass in the form of fine particles of sizes between 2–25 microns while polymerizing from 1–35 percent by weight of the monomer; then (b) discontinuing such agitation of the liquid mixture as results in appreciable shear in the liquid, (c) continuing polymerization of the monomer at temperatures between 85–250° C. until the monomer is substantially polymerized; then, (d) crosslinking to the resulting polymer by heating at temperatures of about 220–285° C. until the toluene-insoluble gel of the polymer product is from 3.5 to 6.5 times the weight of said rubber, said gel constituting less than 70 percent by weight of the polymer product, and having a swelling index of 4–20; and, finally, (e) separating the resulting polymer product from volatile ingredients.

2. In a method of making a thermoplastic polymer composition comprising a graft copolymer wherein a liquid comprising at least one polymerizable monomeric vinylidene aromatic compound having a minor proportion of a rubbery synthetic butadiene polymer contained therein, is heated at elevated temperatures to polymerize the monomer, the steps of:

(a) heating a mixture of said rubber and vinylidene aromatic compound containing (1) about 80 to about 99.5 weight percent of a monoethylenically unsaturated vinylidene monomer selected from the group consisting of vinylidene monomers and acrylonitrile, said monoethylenically unsaturated vinylidene monomer containing at least 50 percent by weight of at least one monovinyl aromatic monomer having the vinyl radical directly attached to the aromatic nucleus, said monoethylenically unsaturated vinylidene monomer being the sole polymerizable monomer and (2) about 0.5 to about 20 weight percent of a stereospecific homopolymer of butadiene-1,3 having a Mooney Number ML 1+4 (212° F.) between 10 and 60, and which consists principally of polymer formed by 1,4-addition reaction with not more than 15 percent by weight of the polybutadiene being polymer formed by a 1,2-addition reaction, at polymerization temperatures of between 85–130° C., while subjecting the liquid to agitation sufficient to maintain the butadiene homopolymer uniformly dispersed throughout the polymerization mass in the form of fine particles of sizes between 2–25 microns while polymerizing from 1–35 percent by weight of the monomer; then, (b) discontinuing such agitation of the liquid mixture as results in appreciable shear in the liquid;

(c) continuing polymerization of the monomer at temperatures between 85–130° C. while subjecting the reaction mixture to agitation sufficient to control the exothermic polymerization reaction and to inhibit appreciable crosslinking of the polymer, but insufficient to inhibit grafting and the formation of high molecular weight polymer until from 35–50 percent by weight of the monomer is polymerized; then, (d) continuing polymerization of the monomer by heating the mixture in an elongated polymerization zone wherein the reacting mixture is continuously moved through said zone and is subjected to progressively increasing temperatures between about 125–185° C., sufficient to maintain the mixture in a flowable condition, until the monomer is substantially polymerized; then, (e) crosslinking the resulting polymer by heating at temperatures of 220–285° C. until the toluene-insoluble gel of the polymer product is from 3.5 to 6.5 times the weight of the said rubber, said gel constituting less than 70 percent by weight of the polymer product and having a swelling index of 4–20; and, (f) separating the polymeric product from volatile ingredients.

3. A process for making a thermoplastic polymer composition comprising a graft copolymer of a vinylidene aromatic hydrocarbon and a homopolymer of butadiene-1,3 which process comprises:

(a) continuously feeding to a first polymerization zone a mixture of said vinylidene aromatic compound and said rubber containing (1) about 85–99 percent by weight of at least one monoethylenically unsaturated aromatic monomer containing at least 70 percent of at least one monovinyl aromatic monomer having the vinyl radical directly attached to the aromatic nucleus, said monoethylenically unsaturated aromatic monomer being the sole polymerizable monomer in said mixture and (2) from about 1–15 percent by weight of a rubbery stereospecific homopolymer of butadiene-1,3 having a narrow molecular weight distribution, a Mooney Number ML 1+4 (212° F.) between 10 and 60, and consisting principally of polymer formed by 1,4-addition reaction with not more than 15 percent by weight of the polybutadiene being polymer formed by a 1,2-addition reaction and said 1,4-addition polymer consisting of a predominant amount of trans 1,4-addition polymer and a minor amount of cis 1,4-addition polymer;

(b) polymerizing said mixture in said first polymerization zone at temperatures between 85–130° C., while agitating the mixture sufficiently to maintain the butadiene homopolymer uniformly dispersed throughout the reacting mass in the form of fine particles of sizes between 2–25 microns until the polymer content is from 7–15 percent by weight of said mixture;

(c) continuously withdrawing said partially polymerized material from said first polymerization zone and feeding it into an elongated, vertical second polymerization zone, progressively increasing the polymerization temperatures to between 110–130° C., while at the same time subjecting the polymerization mixture to agitation sufficient to maintain the rubber dispersed throughout the polymerizing mass in the form of fine particles of sizes between 2–25 microns and continuing the polymerization until the concentration of polymer in the reacting mass is between 35–50 percent by weight of said mixture;

(d) continuously withdrawing partially polymerized material from said second polymerization zone and feeding said partially polymerized material into an elongated, vertical third polymerization zone wherein the reacting mass is subjected to progressively increasing polymerization temperatures between about 125–185° C. and to gently non-turbulent agitation of successive portions of the mass transversely to the longitudinal axis of the elongated polymerization zone, whereby the fluid mass stratifies into layers each containing a progressively increasing amount of polymer as portions of the layers move forward through said polymerization zone and the monomer is progressively polymerized until the polymerization of the monomer is substantially complete; and (e) continuously withdrawing the hot, flowable, substantially polymerized mixture from said third polymerization zone and crosslinking said material by heating at temperatures between 225–285° C. for a time from about 10 to about 90 minutes until the toluene-insoluble gel of the polymer product is from 3.5 to 6.5 times the weight of said rubber, said gel constituting less than 70 percent by weight of the polymer product and having a swelling index of 4–20, while separating volatile ingredients from the polymeric product, then cooling the polymeric product.

4. The process according to claim 1 wherein the vinylidene aromatic hydrocarbon is styrene.

5. The process according to claim 1 wherein the polymerizable liquid consists essentially of a mixture of monomeric styrene and the stereospecific homopolymer of butadiene-1,3.

6. The process according to claim 3 wherein the polymerizable liquid consists of a mixture of about 95 percent by weight of monomeric styrene and about 5 percent by weight of the stereospecific homopolymer of butadiene-1,3.

References Cited by the Examiner

UNITED STATES PATENTS

| | | | |
|---|---|---|---|
| 1,613,673 | 1/1927 | Ostromislensky | 260—4 |
| 2,694,692 | 11/1954 | Amos et al. | 260—880 |
| 2,861,974 | 11/1958 | Lang | 260—880 |
| 2,862,906 | 12/1958 | Stein et al. | 260—880 |
| 3,050,513 | 8/1962 | Zelinski et al. | 260—94.3 |
| 3,060,989 | 10/1962 | Railsback et al. | 260—880 |
| 3,079,295 | 2/1963 | Slotterbeck et al. | 260—880 |
| 3,129,199 | 4/1964 | Lunk | 260—880 |
| 3,166,609 | 1/1965 | Wilder | 260—5 |

OTHER REFERENCES

Schildknecht: Vinyl and Related Polymers, John Wiley and Sons, Inc. (1952 ed.), pp. 68–72.

MURRAY TILLMAN, *Primary Examiner.*

WILLIAM H. SHORT, LEON J. BERCOVITZ,
*Examiners.*

N. W. SHUST, G. F. LESMES, *Assistant Examiners.*